(12) United States Patent
Buer

(10) Patent No.: US 8,037,518 B2
(45) Date of Patent: *Oct. 11, 2011

(54) DATA PROCESSING HASH ALGORITHM AND POLICY MANAGEMENT

(75) Inventor: Mark L. Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/557,305

(22) Filed: Sep. 10, 2009

(65) Prior Publication Data

US 2009/0323931 A1 Dec. 31, 2009

Related U.S. Application Data

(63) Continuation of application No. 10/365,305, filed on Feb. 12, 2003, now Pat. No. 7,669,234.

(60) Provisional application No. 60/437,535, filed on Dec. 31, 2002.

(51) Int. Cl.
*G06F 9/00* (2006.01)
*G06F 15/16* (2006.01)
*G06F 17/00* (2006.01)
G06F 15/177 (2006.01)
G06F 15/173 (2006.01)
H04L 12/28 (2006.01)
H04L 12/56 (2006.01)

(52) U.S. Cl. .......... 726/11; 709/220; 709/225; 709/245; 709/250; 370/395.32; 370/389; 370/392

(58) Field of Classification Search .................. None
See application file for complete search history.

(56) References Cited

U.S. PATENT DOCUMENTS

| 6,754,662 | B1 * | 6/2004 | Li ................................ 707/693 |
| 6,820,121 | B1 * | 11/2004 | Callis et al. .................... 709/225 |
| 6,925,085 | B1 * | 8/2005 | Krishna et al. ............ 370/395.32 |
| 7,082,102 | B1 * | 7/2006 | Wright ........................ 370/229 |
| 7,669,234 | B2 | 2/2010 | Buer |
| 2001/0042204 | A1 * | 11/2001 | Blaker et al. .................. 713/165 |
| 2002/0116527 | A1 * | 8/2002 | Chen et al. ..................... 709/245 |
| 2004/0123220 | A1 | 6/2004 | Johnson et al. |

FOREIGN PATENT DOCUMENTS

WO WO 01/05087 1/2001

OTHER PUBLICATIONS

Office Action from European Application No. 03029793.1, dated Jul. 3, 2009, 7 pages.
European Search report for European Application No. 03029793.1, mailed Jul. 28, 2005, 2 pages.
Jun, E. et al., "A Novel Cache Architecture to Support Layer-Four Packet Classification at Memory Access Speeds," INFOCOM 2000, *Proceedings of the 19th Annual Joint Conference of the IEEE Computer and Communication Societies*, vol. 3, Tel Aviv, Mar. 26, 2000, pp. 1445-1454.

(Continued)

*Primary Examiner* — Shin-Hon Chen
(74) *Attorney, Agent, or Firm* — Sterne, Kessler, Goldstein & Fox PLLC

(57) ABSTRACT

Methods and associated systems for processing data are disclosed. A hashing function sequentially processes a hash key to generate a hash value. A policy management system processes packets according to defined policies.

19 Claims, 12 Drawing Sheets

OTHER PUBLICATIONS

Jun, X. et al., "Cost Effective Flow Table Designs for High-Speed Routers: Architecture and Performance Evaluation," *IEEE Transactions on Computers* 51:9, Sep. 2002, pp. 1089-1099.

Ramakrishna, M.V. et al., "Efficient Hardware Hashing Functions for High Performance Computers," *IEEE Transactions on Computers* 46:12, Dec. 1997, pp. 1378-1381.

Carter, J.L. et al. "Universal Classes of Hash Functions," *J. of Computer and System Sciences,* vol. 18, Academic Press, Inc., London, pp. 143-154.

Ramakrishna, M.V. et al., "Efficient Hardware Hashing Functions for High Performance Computers," *Technical Report Series,* Dept. of Computer Science, RMIT University, Melbourne, Apr. 1996, pp. 1-29.

Ramakrishna, M.V., et al., "Perfect Hashing Functions for Hardware Applications," Proceedings of the International Conference on Data Engineering, Kobe, Japan, Apr. 8-12, 1991, *IEEE Computer Society Press,* vol. CONF 7, Apr. 8, 1991, pp. 464-470 (XP010022765).

* cited by examiner

DATA PROCESSING HASH ALGORITHM AND POLICY MANAGEMENT

CROSS REFERENCE TO RELATED APPLICATIONS

This application is a continuation of U.S. patent application Ser. No. 10/365,305, filed on Feb. 12, 2003, titled "Data Processing Hash Algorithm and Policy Management", now U.S. Pat. No. 7,669,234, which claims the benefit of U.S. Provisional Patent Application No. 60/437,535, filed Dec. 31, 2002, the contents of which are hereby incorporated by reference.

FIELD OF THE INVENTION

The invention relates generally to the field of data processing and, more particularly, to hashing algorithm systems and methods and to systems and methods for applying policies to data packets.

BACKGROUND OF THE INVENTION

The transmission of data over a data network typically involves sending messages between application programs ("applications") executing on host processors connected to the data network. In a packet network such as the Internet a host processor encapsulates data from an application into data packets to send the data over the packet network. When a host processor receives the data packet from the packet network, the host processor decapsulates the packets to obtain the data. The host processor then provides the data to the appropriate application.

The process of encapsulating data into a packet involves adding information such as source and destination addresses to the data to facilitate transmission of the data over the packet network. Conventionally, the encapsulation process follows a particular packet data protocol. A typical protocol defines the structure of a packet such as the location of the source address and the destination address in the packet. A protocol also may define procedures for routing the packet over the network using those addresses. For example, the components in a data network may use the destination address to determine where to send the packet. The recipient application may use the source address to determine which application sent the packet.

Common protocols used in conjunction with the Internet include Internet protocol ("IP"), transmission control protocol ("TCP"), user datagram protocol ("UDP") and Internet control message protocol ("ICMP"). In general, IP relates to controlling data transfer between host processors, TCP relates to establishing sessions to transfer data between applications, UDP provides a faster but less reliable data transfer mechanism than TCP, and ICMP relates to error messages and network traffic statistics.

Data transmitted over public networks such as the Internet may be encrypted to prevent unauthorized parties from intercepting the data. Typically, a device connected to the network encrypts data using a cipher algorithm and an encryption key. The device sends the encrypted data over the network to another device that decrypts the data using the cipher algorithm and a decryption key.

Several standards have been developed to facilitate secure data transmission over data networks. For example, the Internet security protocol ("IPsec") may be used to establish secure host-to-host pipes and virtual private networks over the Internet. IPsec defines a set of specifications for cryptographic encryption and authentication. IPsec also supports several algorithms for key exchange, including an Internet Key Exchange ("IKE") algorithm for establishing keys for secure sessions established between applications.

There is a perpetual need for increased operating speed and implementation flexibility in data communications systems. On the one hand, developers are continually creating applications that require increasingly greater amounts of data to be sent between system components. On the other hand, end users want their applications to run faster which, in turn, often requires that associated data transfers be performed more quickly.

To increase system performance, some systems incorporate dedicated devices that offload some of the processing operations from the host processor. For example, a network processor may be used to perform some of the packet processing operations. A cryptographic accelerator may be used to perform the cipher algorithms to offload encryption, decryption and authentication processing from the host processor.

In a typical system, the primary data flow is from the host processor to the network processor then to the network, and vice-versa. In addition, the host processor or network processor routes packets that will be encrypted or decrypted to the cryptographic accelerator. The cryptographic accelerator then routes the encrypted or decrypted packets back to the host processor or network processor. In personal computer-based systems, the host processor, network processor and cryptographic accelerator typically are connected via a peripheral component interface ("PCI") bus.

In addition, to address the need for faster data communications, various groups have developed standards that specify high-speed data transfers between components of data communication systems. For example, IEEE standards 802.3ab and 802.3z define Ethernet systems for transferring data at rates up to one gigabit per second (1 Gbit/s). IEEE standard 802.3ae defines an Ethernet system for transferring data at rates up to 10 Gbits/s.

Various techniques also have been developed relating to faster processing of data. To support ever increasing data transmission rates techniques have been developed to increase the speed at which data may be located in a data memory. For example, conventional data lookup operations may use hashing algorithms to quickly locate the address of a specific type of data stored in a data memory. A hashing algorithm typically defines techniques for processing a "key" to generate an address. Thus, the address is initially generated using the key and the data is stored at that address. At a later point in time, the key is used to regenerate the address to retrieve the data.

The ever increasing need for faster data processing and data transfers and development of the standards discussed above contribute to the need for techniques and circuits capable of achieving high data transfer rates. Moreover, there is an ever-present economic motivation to achieve such results in a cost effective and adaptable manner. Accordingly, a need exists for improved packet processing techniques to support data transmission over data networks and a need exists for improved techniques for processing data.

SUMMARY OF THE INVENTION

The invention relates to methods and associated systems for processing data. For example, a device constructed according to one embodiment of the invention provides an improved hashing function. A device constructed according to one embodiment of the invention processes packets according to defined policies.

In one embodiment of the invention, a hashing function processes a portion of the hash key at a time to sequentially calculate a hash value. A set of linear feedback shift registers generates random numbers associated with each bit in each portion of the hash key. The random numbers are XORed together according to the value of each bit to generate an intermediate hash value. The intermediate hash value is XORed with the random numbers for the next portion of the hash key. Once all of the portions of the hash key have been processed, the resulting hash value provides an address that may be used to locate information associated with the hash key.

In one embodiment, the hashing algorithm is used to locate security association information associated with a session. For example, selectors such as a TCP/IP destination address, source address, protocol, destination port and source port may comprise the hash key. These selectors may then be hashed down to locate the address of the security association that is to be used to process packets for the corresponding session.

In one embodiment of a system constructed according to the invention, policies are defined for particular sessions so that as packets for such a session are received, actions associated with the policies are performed on the packets. A hashing algorithm as described above may be used to locate the policies for received packets. For example, the session information for the received packet may be hashed down to generate an address that contains policy information for that session.

One embodiment of a system constructed according to the invention comprises a firewall preclassifier. This system may take action on packets for a session such as rejecting or routing the packets according to the policy associated with the session.

BRIEF DESCRIPTION OF THE DRAWINGS/FIGS.

These and other features, aspects and advantages of the present invention will be more fully understood when considered with respect to the following detailed description, appended claims and accompanying drawings, wherein:

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

Figure 1:
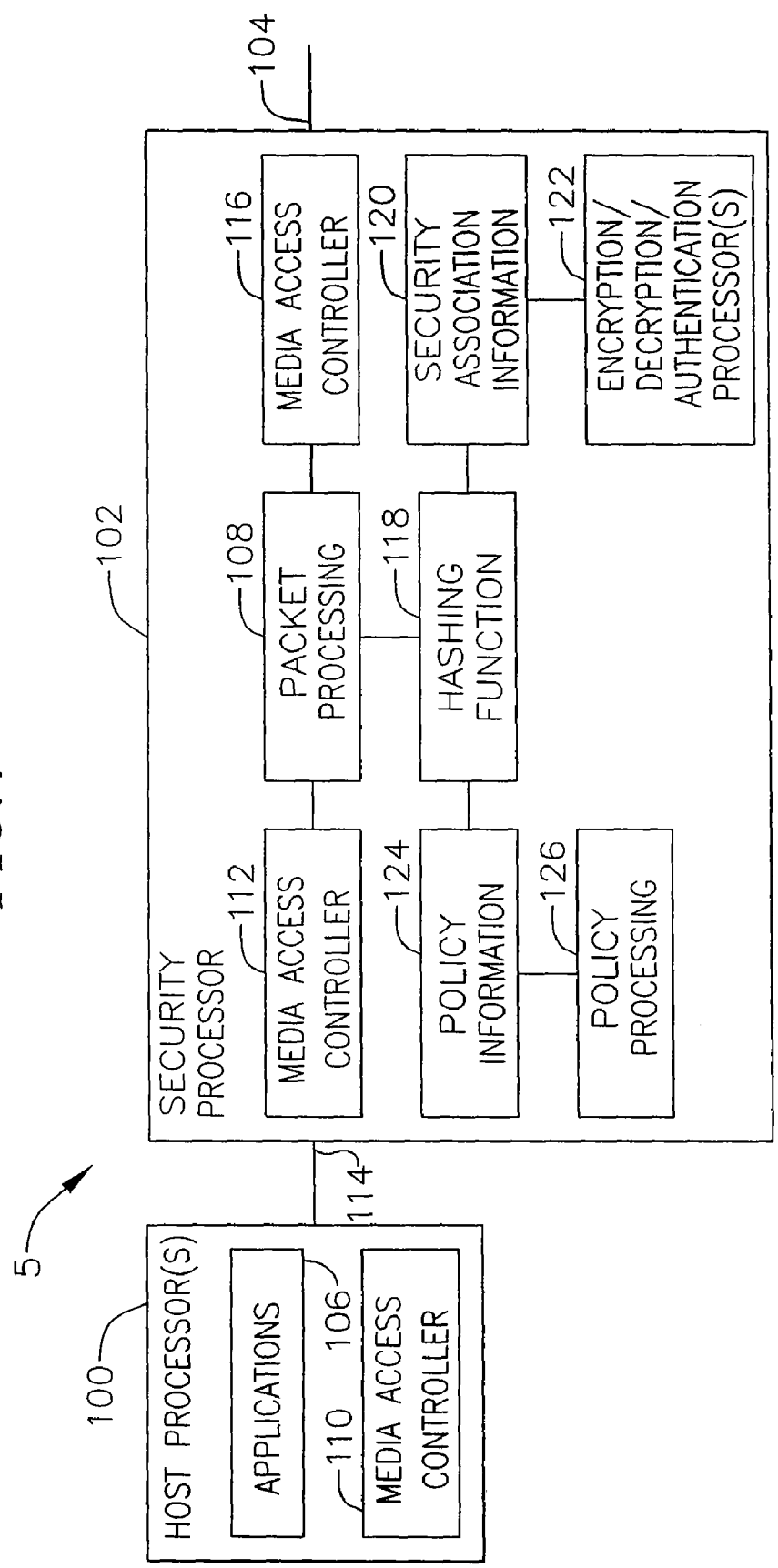
FIG. 1 is a block diagram of one embodiment of a packet processing system constructed in accordance with the invention.

FIG. 1 is a block diagram of one embodiment of a packet processing system S constructed according to the invention. An application 106 executing on a host processor 100 establishes a connection with another application (not shown) via a packet network 104. To provide secure data transmission, a security processor 102 encrypts, decrypts and/or authenticates some of the data the application 106 sends to and receives from the other application over the packet network 104. As used herein, the term security processor refers to one or more processing components that encrypt, decrypt or authenticate data or perform any combination of these operations.

The embodiment of FIG. 1 may communicate over the packet network 114 using the TCP/IP protocols. Thus, the host processor 100 and/or an associated processor includes TCP/IP processing that establishes TCP sessions with the other applications. The TCP/IP processing encapsulates session data being sent over the network and decapsulates session data received from the network 104.

The host processor 100 communicates with the security processor 102 via a packet link 114. Thus, the host processor 100 includes a media access controller 110 that communicates with a media access controller 112 in the security processor 102. Another media access controller 116 in the security processor 102 communicates with the network 104.

The security processor 102 may support the IPsec protocol. For example, the security processor 102 may include one or more encryption/decryption/authentication processor(s) 122 that encrypts TCP/IP packets received from the host processor 100. In addition, the security processor 102 may format the encrypted packets as IPsec packets for transmission over the network 104.

In accordance with conventional practice, the encryption/decryption/authentication processor 122 uses security associations in conjunction with its encryption/decryption/authentication algorithms. For example, a security association may specify an encryption algorithm to be used to encrypt data from a particular application. A security association also may include an encryption key used by the encryption algorithm.

In practice, an application may establish several connections with other applications via the packet network 104. To maintain the security of these connections, the security processor 102 may use different security associations to encrypt, decrypt or authenticate data for each of these connections.

In accordance with one embodiment of the invention, the security processor 102 includes a hashing function 118 that may be used to locate information stored in data memory that is associated with or is used by the packet processing 108. For example, the input to the hashing function 118 may be session information that the packet processing 108 extracts from a packet. The hashing function 118 may then hash the session information to generate the address of the information stored in the data memory.

In one embodiment, the hashing function 118 generates the address of security association information 120 for a session. The encryption/decryption/authentication processor 122 may use the security association information 120 to encrypt, decrypt and/or authenticate packets for that session.

In one embodiment, the hashing function 118 generates the address of policy information 124 for a session. Policy processing 126 may use the policy information 124 to determine how to handle packets for a session.

Figure 2:
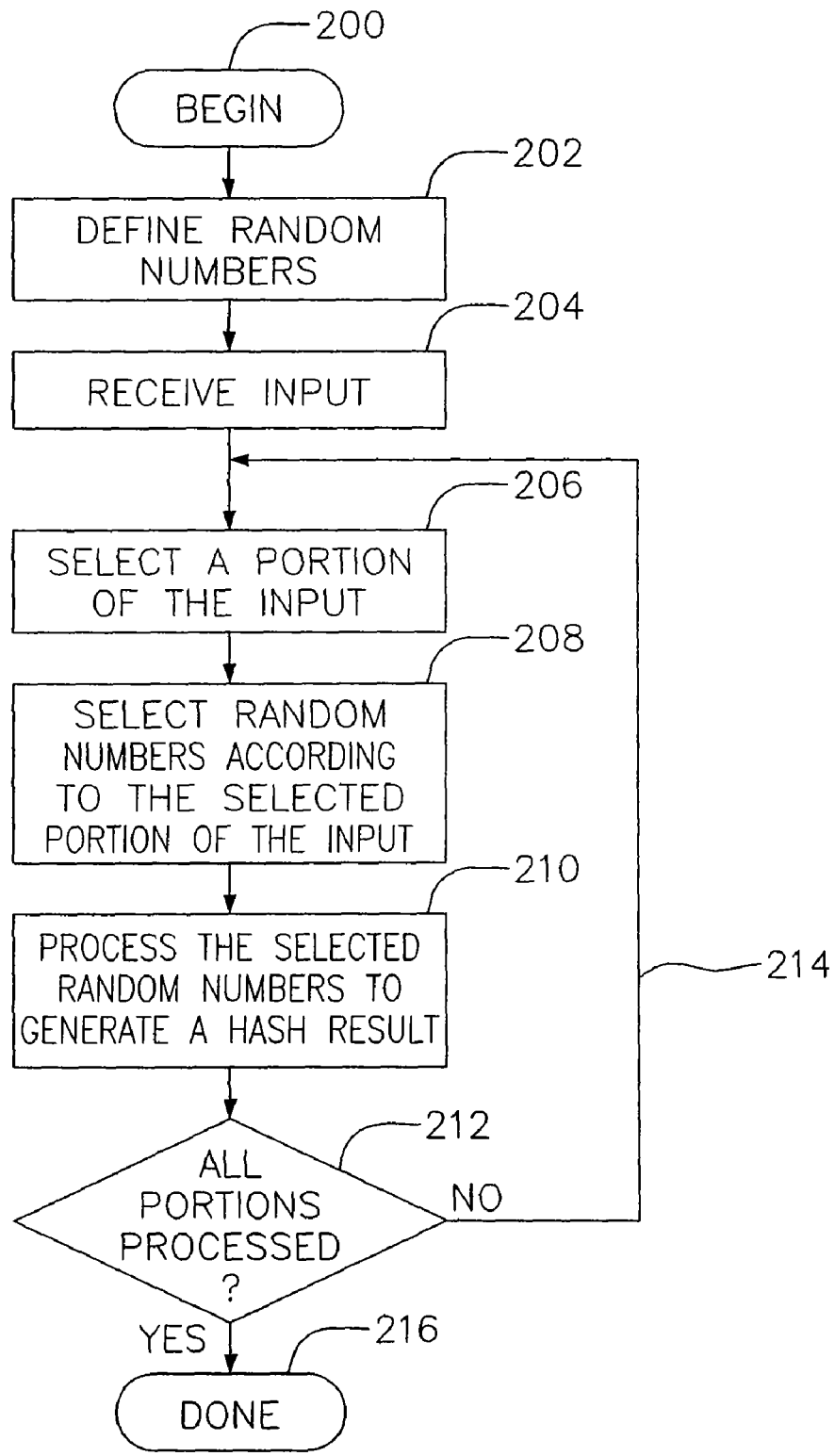
FIG. 2 is a flowchart representative of one embodiment of hashing operations that may be performed in accordance with the invention.

FIG. 2, beginning at block 200, is a flowchart representing one embodiment of operations that may be performed by the hashing function 118. As represented by block 202, the hashing function defines several random numbers. When the hashing function receives an input key (block 204), the hashing function selects a portion of the key to process (block 206).

Then, as represented by block 208, the hashing function selects several of the random numbers based on the selected portion of the key. For example, each of the random numbers may be associated with one of the bits of the selected portion of the key. The random numbers may then be selected depending on whether the value of the corresponding bit is a zero or a one.

As represented by block 210, the hashing algorithm processes the selected random numbers to generate a hash result. For example, in one embodiment, the random numbers are combined using an exclusive OR ("XOR") operation.

As discussed above, the hashing function processes a portion of the key at a time. Thus, as represented by block 212 and line 214, the hashing function processes each portion of the key in turn. In one embodiment, after each portion of the key is processed, the resulting hash result is XORed with the selected random numbers for the next portion of the key.

After all of the portions of the key have been processed (block 216), the final hash result is an address that may be used to locate the desired information.

One embodiment of a security processor that provides a per packet search function to locate security associations for inbound and outbound packets will now be discussed. The security processor associates every packet with a flow based on selectors that are extracted from the packet. The selector extraction process may depend on the packet type. Three common packet types include:
  1) Outbound Packets (non-IPsec);
  2) Inbound IPv4/IPv6 Packets (non-IPsec); and
  3) Inbound IPv4/IPv6 IPsec Packets.

The three packet types are each mapped into their own flow table each with a unique flow table base address. Selectors that the security processor may extract from an IP (outbound or inbound non-IPsec) packet include the following:
  1) Source Address;
  2) Destination Address;
  3) Protocol;
  4) Source Port (TCP, UDP, ICMP);
  5) Destination Port (TCP, UDP, ICMP); and
  6) User Defined (3 Bytes).

Selectors that the security processor may extract from an IPsec packet (inbound IPsec) packet include the following:
  1) Security Parameter Index—SPI (AH, ESP);
  2) Destination Port (TCP, UDP, ICMP);
  3) Protocol; and
  4) User Defined (3 Bytes).

Each selector may be individually enabled for each flow table. The user defined bytes may be individually added to the flow selectors. The three user defined bytes may each have the following selectable options for extracting data from the packet 3:
  1) 8 bit Offset (0-255 bytes);
  2) Starting Location for Offset (BufferData or IP Header);
  3) Enable for IPv4 Packets; and
  4) Enable for IPv6 Packets.

The selectors are extracted from the packet by the security processor into an SAHandle field. The selectors are hashed by the security processor into an address (8-24 bits) that is used as an entry point into the flow table (see FIG. 6). The SPI can optionally be used as the entry point into the flow table or as the direct address of the security association data. Any of the selector fields that are not extracted by the security processor may be set to zero in the generated SAHandle field and not used in the flow lookup (zero valued selectors do not affect the hash calculation). The host can optionally provide the SAHandle (selectors) directly to the security processor.

The ICMP "type"/"code" (upper 16 bits) are mapped into the source port location (same location in the packet as UDP or TCP) of the selectors. A 16 bit mask value is applied to the source port selector location in the generation of the SAHandle for all ICMP traffic. The destination port selector is always set to zero for ICMP packets.

Figure 3:
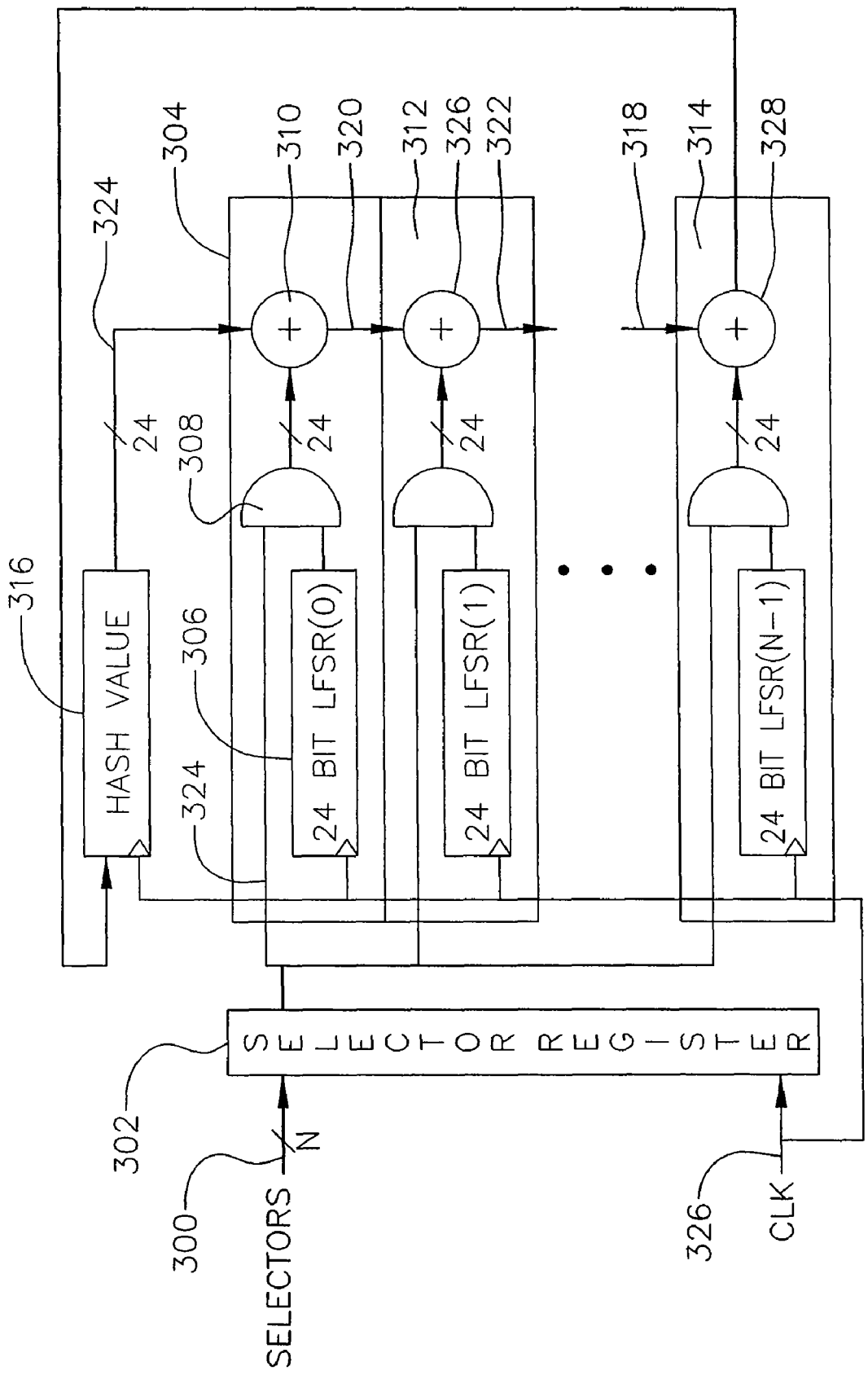
FIG. 3 is a block diagram of one embodiment of a hashing circuit constructed in accordance with the invention.

Referring now to FIG. 3, one embodiment of a hashing function circuit that may be used, for example, by a security processor is shown. The hashing function circuit implements a modified universal hash function that may be used to hash the packet selectors into an address that is used as an entry point into the flow table.

The universal hash function is used to provide a "hash" that represents a unique set of bits in a "key". Since the total number of bits used in the "key" is larger than the number of bits in the hash, there exists the possibility of a "collision" of hash values. A "collision" occurs when two "keys" result in the same "hash" value.

The security processor "keys" are the selector values that correspond to a flow. Thus the flow table is organized according the "hash" that identifies a unique flow. The flow entries in the flow table are found by using the resulting "hash" value for the flow entry selectors.

The performance of a hashing function depends on the loading factor of the hash table. In the case of the security processor, the loading factor is determined by the size of the flow table:

Load Factor=Number of Keys/Size of hash table.

For example, a flow table size of 24 bits represents 2^24 flow table size or 16 Million flow elements. The maximum number of security associations supported by the security processor is 2 Million. Assuming they are equally distributed as inbound and out-bound security associations, there are 1 Million security associations per flow table that are possible. Using an average of 8 flows per security association, the total number of keys in the system when fully utilized is 8 Million keys producing a load factor of 50%.

The performance of the security processor hashing function provides extremely good results at a load factor of 50%. Theoretical data suggests that the maximum search length for a 60% loaded universal function is no longer than 7 entries. Experimental results show that the maximum search length for the modified hashing function using a 50% loaded scheme with actual packet data used as the selectors is within these limits (6 entries).

The flow distribution of the hashing function does exceptionally well under both actual packet selectors and random packet selectors. For a 50% loaded function, the distribution is shown as:

Flow Distribution:BIN:Accum-Total
BIN (0): 106591: 78%: 78%
BIN (1): 25130: 18%: 96%
BIN (2): 4142: 3%: 99%
BIN (3): 516: 0%: 99%
BIN (4) 54: 0%: 99%
BIN (5): 5: 0%: 100%

The hash function used by the security processor still performs extremely well even when it is over loaded at a 150% load factor the distribution is shown as:

Flow Distribution:BIN:Accum-Total
BIN (0): 202964: 51%: 51%
BIN (1): 115314: 29%: 81%
BIN (2): 49709: 12%: 93%
BIN (3): 17068: 4%: 98%
BIN (4): 4908: 1%: 99%
BIN (5): 1198: 0%: 99%
BIN (6): 257: 0%: 99%
BIN (7): 51: 0%: 99%
BIN (8): 7: 0%: 99%
BIN (9): 3: 0%: 100%

The hash function even holds up in an over loaded scenario where the load factor is greater than 300%, the longest search length is 14 flow entries. The first 6 flow entries contain 98% of all flows and 76% of all flows are found in the first 3 flow entries.

As illustrated in FIG. 3, the security processor may use a modified H3 universal hash function. The H3 function uses a matrix Q of size i×j. The value Q(i) represents a number (24 bits in the case of the security processor) that is chosen at random. The value that is hashed is represented by X where X(k) is the k th bit of X. The hashing function is determined as:

H3q(x)=(x(1) AND Q(1)) XOR (x(2) AND Q(2)) XOR . . . XOR (x(i) AND Q(i))

The hash function XORs the number in Q(i) if the corresponding X(i) bit is set to one. Therefore any zero values are ignored in the calculation of the hash value.

The security processor generates a 24 bit hash value that is truncated to the appropriate size based on the size of the flow table. Since the numbers in Q are chosen at random, truncation has no effect on the performance of the hash function other than increasing the load factor.

It is noted that the array that represents the matrix Q could be made programmable but the number of bits for IPv6 (10 Kbits) is relatively large. Additionally implementing such a function directly would require a large number of gates. Accordingly, the disclosed modified H3 algorithm fits well into the architecture of the security processor.

A convenient way to calculate the hash values is 32 bits at time when the internal data path of the security processor is 32 bits. The maximum number of values to hash is 320 bits in the case of IPv6. The maximum time required to hash is determined by processing 5 Mpps or 200 ns. Therefore, even at 100 MHz, there would be 2 cycles per word to calculate the hash value or 16 bits at a time. The implementation described here will work with any bit width, simply a trade-off of speed versus gate size.

The modified H3 algorithm uses initial random values with the size of the hash width (24 bits in this case) to populate the first N (processing width, 16 in this case) locations of the implementation. The modified H3 algorithm uses LFSRs that are reset to the initial random values to generate the subsequent "related" random values on each subsequent clock.

As shown in FIG. 3, the XOR stages from 0 to N−1 can be pipelined such that the resulting final hash value is delayed by a couple of clocks. This architecture results in a compact algorithm that may be pipelined to run at high frequency without compromising the performance of the hashing function.

Figure 5:
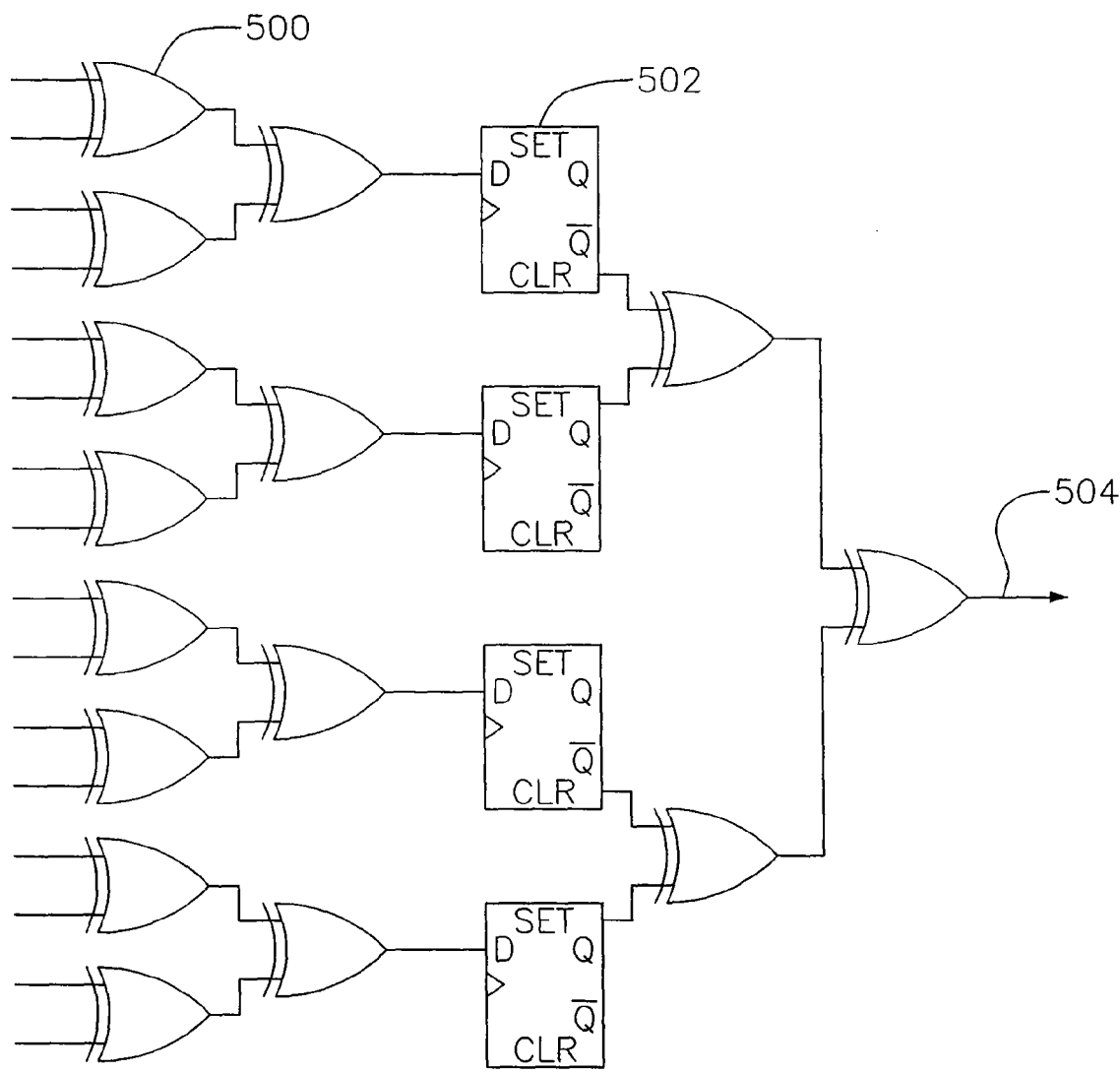
FIG. 5 is a block diagram of one embodiment of a XOR circuit constructed in accordance with the invention.

An example of pipelined XOR reduction stages is shown in FIG. 5. The example shows a reduction from 8 to 1, the reduction required in FIG. 3 is an N+1 to 1 reduction (33 to 1 for the security processor) based on the width of the selectors that are hashed (32 bits in the security processor).

Figure 4:
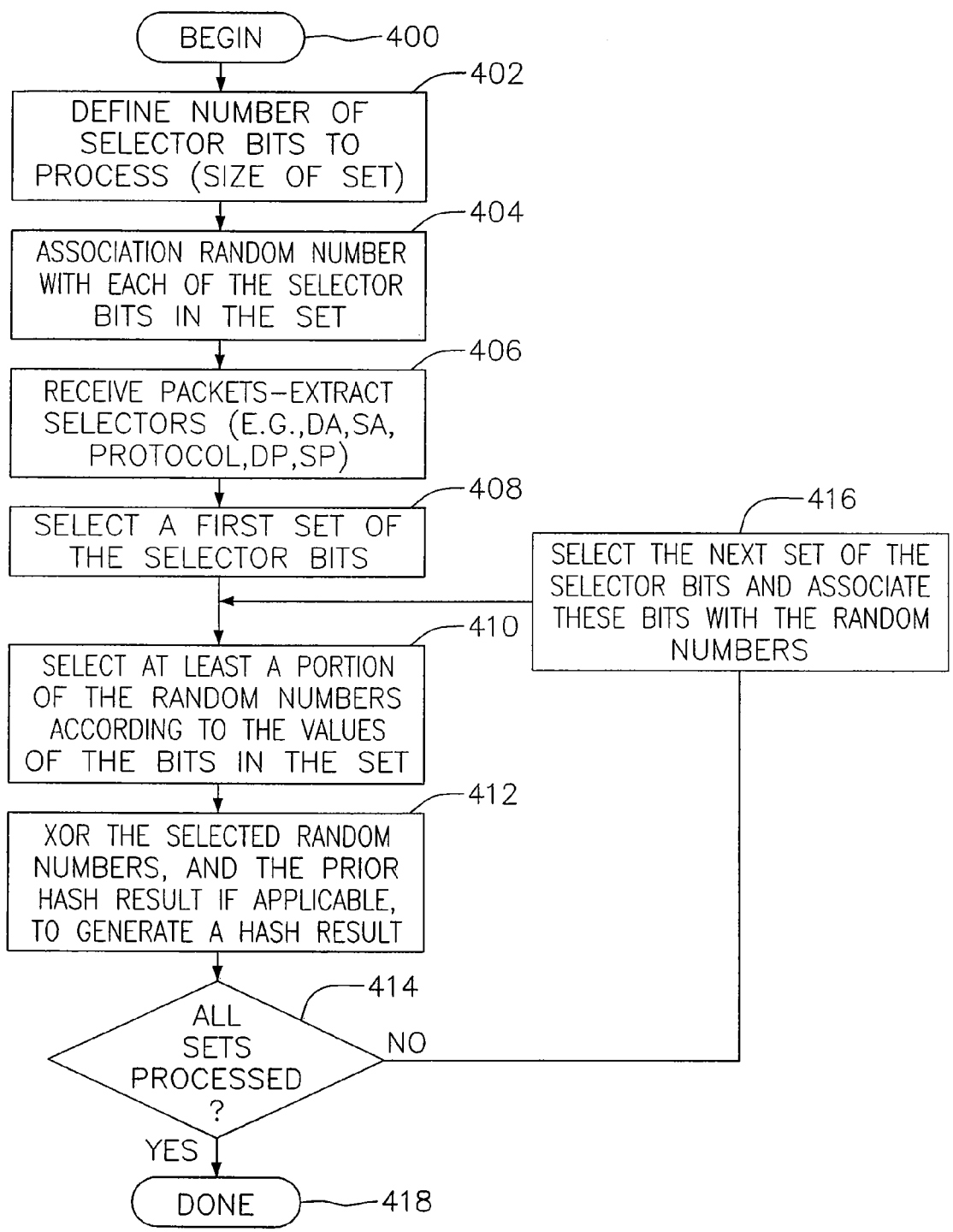
FIG. 4 is a flowchart representative of one embodiment of hashing operations that may be performed in accordance with the invention.

One embodiment of operations of the hashing circuit of FIG. 3 will be treated in conjunction with the flowchart of FIG. 4. FIG. 4 represents, beginning at block 400, operations of a security processor that incorporates a hashing circuit to locate security associations for packets received by the security processor.

As represented by block 402, the hashing circuit is defined with a specific width of the selector register 302. For example, the specified number of bits of the selector will be processed each clock cycle.

As represented by block 404, each of the bits of the selector register 302 is associated with a linear feedback shift register (e.g., shift register 306) that generates pseudo random numbers.

When security processor receives a packet, it extracts the selectors from the packet (block 406). These selectors may include, for example, TCP/IP destination address, source address, protocol, destination port and/or source port.

As represented by block 408, the security processor writes the first set of the selector bits to the selector register 302.

Then, as represented by block 410, the AND logic gates (e.g., AND gate 308) controls which of the random numbers from the linear feedback shift registers is provided to the XOR circuits (e.g., XOR circuit 310). For example, if the value of the bit 302 in the selector register is a one, then the random number generated by linear feedback shift register 306 will be provided to the XOR circuit 304 by AND gate 308.

As represented by block 412, the XOR circuits (e.g., XOR circuits 310, 326 and 328 and connections 318, 320 and 322) XOR the random numbers together to generate a hash value that is stored in a register 316.

As represented by block 414, the hashing circuit processes each portion of the selectors in turn. Here, after each portion is processed, the hash value is XORed with the random numbers for the next portion of the selectors (block 416).

After all of the portions of the key have been processed, the final hash value will be stored in the data memory 316.

Figure 6:
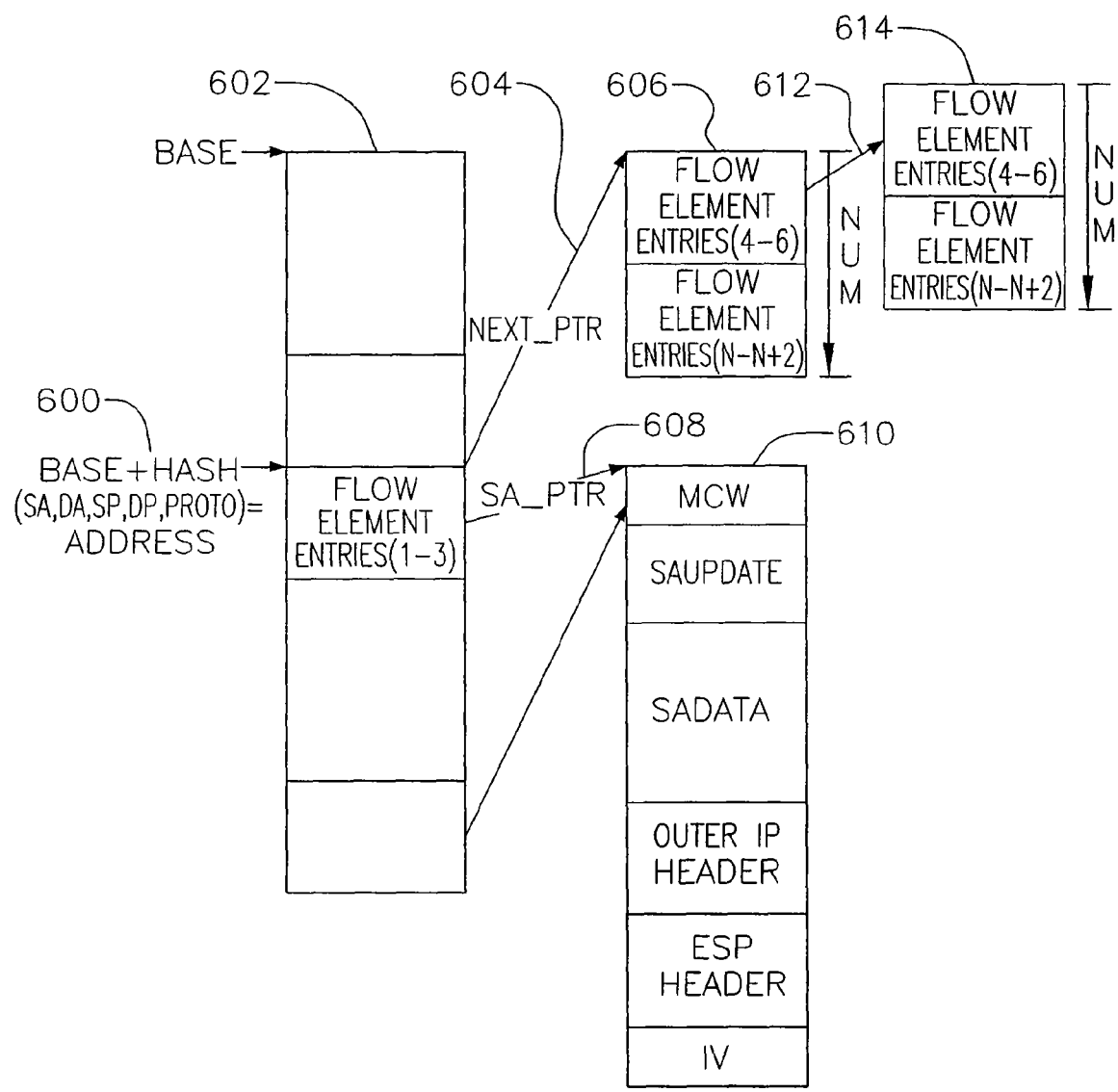
FIG. 6 is a diagram representative of one embodiment of a memory structure that may be used in accordance with the invention.

FIG. 6 is a diagram representative of one embodiment of a flow table memory structure that may be used in accordance with the invention. The security processor flow table is managed indirectly by the host processor. The host processor provides selectors via memory access packets that are added (or deleted) from the flow table automatically by the security processor. Therefore the host is not required to calculate the "hash" value and do a search to add (or delete) the entry in the flow table.

The flow tables are located in memory local to the security processor. The structure of a flow table (shown in FIG. 6) is described by a size in bits (8-24 bits) and a base address that contains the upper address bits of the flow table (i.e. the base address is aligned to the size of the flow table). An address into the flow table describes a flow element with a 64 byte (5 bits) element size. For example, a 20 bit flow table size would use the upper 7 bits (32−(20+5)=7) of the flow table base address to generate the complete 32 bit local memory address.

The flow elements located in the flow table are called "base" elements. The security processor uses the selectors to calculate a hash value equal to the size (in bits) of the flow table. The local memory address is generated as {base address, hash result, 5'b0} 600. The base flow element is read from the resulting local memory address.

All flow elements contain a pointer 604, 612 to the next flow element(s) 606, 614 in the chain. A flow element may contain either 1 IPv6 flow entry or 3 IPv4 flow entries. The NEXT_PTR 604, 612 provides the next flow element in this chain. The NUM value is fixed globally from 1-4 elements. The security processor uses a separate base address register for chained flow elements. All flow tables share the chained flow element space (memory is allocated by the host to the security processor).

Figure 7:
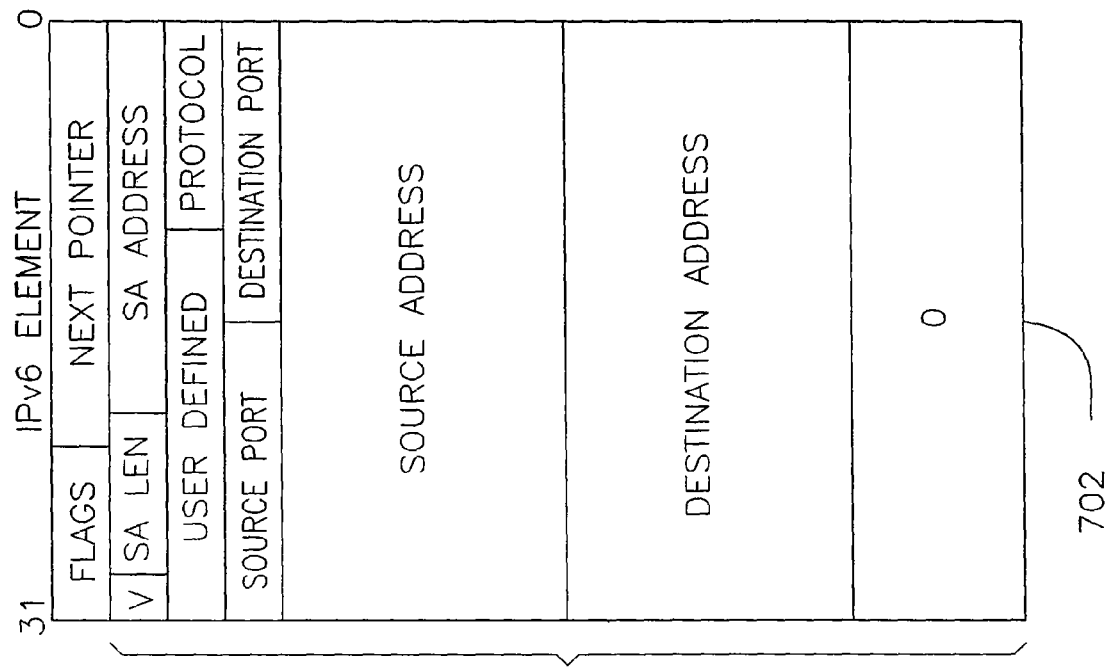
FIG. 7 is a diagram representative of one embodiment of flow elements that may be used in accordance with the invention.
Figure 7:
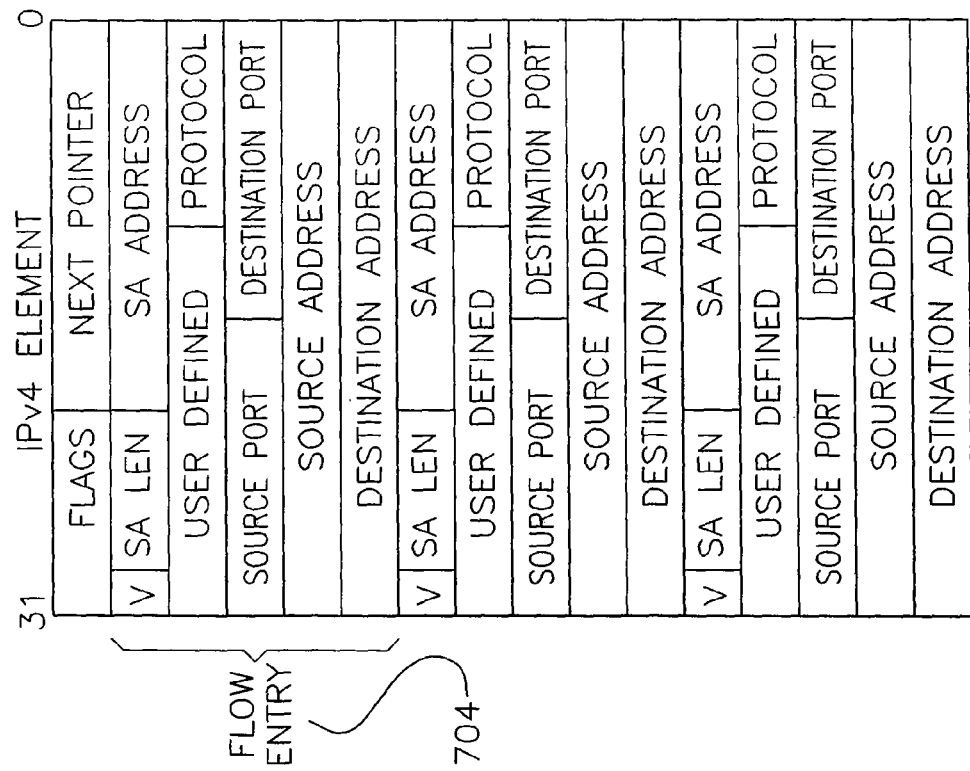

FIG. 7 is a diagram representative of one embodiment of flow elements that may be used in accordance with the invention. The structure in FIG. 7 is labeled with the typical selector information for IPv4 or IPv6 packets. For IPv4 flow elements words 1-5 of Table 1 are replicated two more times to fill out the 64 byte flow element. Therefore, an IPv4 flow element 700 contains 3 flow entries 704. An IPv6 flow element 702 only contains one flow entry 706. The "next" flow elements are linked lists using the NUM value and NEXTPTR field. An efficient way to link entries is to keep them in one contiguous memory location.

If all of the "next" flow elements are contiguous, they can be described by one NUM and NEXTPTR value allowing the security processor to fetch them all in a single burst.

TABLE 1

Flow Element Format (Structure in Memory)

| Field | Word | Bits | Definition |
|---|---|---|---|
| IPv6 | [0] | [31] | FLOW ELEMENT IS IPV6: Indicates the format of this flow element. The security processor can only change the format of the flow element if all flow entries are empty (not valid). |
| NEXT_VAL | [0] | [30] | NEXT POINTER VALID: Indicates that the next pointer value is valid. When invalid, this element is the last element in the chain. |
| RESERVED | [0] | [29:26] | Must be zero. |
| NEXT_PTR | [0] | [25:0] | NEXT POINTER: The address of the next set of elements. This address is 64 byte aligned and a base register is provided for the upper bits in the security processor. |
| VALID | [1] | [31] | VALID FLOW ENTRY: Ignored in the SAHandle structure. |
| RESERVED | [1] | [30] | Must be zero. |
| SA_LEN | [1] | [29:22] | SECURITY ASSOCIATION LENGTH: Indicates the length in 32 bit words of the SA structure in memory. The maximum length of the SA structure is 1024 Bytes. |
| SA_PTR | [1] | [21:0] | SA POINTER: Indicates the start address of the security association structure in memory aligned to 128 byte boundary. |

TABLE 1-continued

Flow Element Format (Structure in Memory)

| Field | Word | Bits | Definition |
|---|---|---|---|
| UserDef Select | [2] | [31:8] | USER DEFINED SELECTORS: These selector values are user defined for further granularity. The security processor allows this value to be extracted from the packet. |
| Source Port[a] | [3] | [31:16] | SOURCE PORT SELECTOR: The source port selector extracted for TCP or UDP packets (set to zero for all others). |
| Destination Port[b] | [3] | [15:0] | DESTINATION PORT SELECTOR: The destination port selector extracted for TCP or UDP packets (set to zero for all others). |
| Source Address | [4] [4-7] | [31:0] | SOURCE ADDRESS SELECTOR: The source address selector extracted from the packet (set to zero for inbound packets). |
| Destination Address | [5] [8-11] | [31:0] | DESTINATION ADDRESS SELECTOR: The destination address selector extracted from the packet. |

[a]The SourcePort/DestinationPort locations are used for the SPI on inbound IPsec packets
[b]The SourcePort/Destination Port locations are used for the SPI on inbound IPsec packets The flow entries contain the selectors that are matched to the packet selectors for each flow. In addition to the selector "keys", the flow entry contains the memory location (SA_PTR 608) and size (SA_LEN) of the SA Data Structure 610.

The SA_PTR 608 is a 22 bit address that is combined with the SA base address register to generate a 128 byte aligned address. For internal memory, the SA_PTR value is the actual internal memory word address. The SA_LEN is an 8 bit value that describes the number of 32 bit words in the SA Data Structure 610.

The 22 bit SA_PTR address allows the security processor to support 4 Million security associations of up to 128 bytes or 2 Million security associations up to 256 bytes in size.

The maximum size of the SA Data Structure is 1024 bytes.

One embodiment of host flow table management will now be discussed. The organization of the flow table supports multiple flows pointing to the same security association data (allows the use of wildcards, ranges, etc. in the policy used to establish the security association). The SA Data Structure can be updated using a memory access command. The entire structure can be changed in a single access to memory allowing the SA Data Structure to be updated coherently. Since the memory access command goes through the PSU, the order of the security association update is maintained with the packet order through the device.

The flow table need not be changed when updating a security association. The flow table need only be changed when the policy database changes. If the policy changes, then the host needs to disable any security associations that are associated with that policy.

The host may include policy verification data as part of every security association (SAUpdate) such that changing a policy only requires that the corresponding security associations are removed without any changes to the flow table. The security processor will verify that a flow associated with a security association is valid before using that security association. The advantage of using policy verification is that the other flows need not be changed during a policy configuration change. The disadvantage is that eventually, the flow table may become more densely populated due to fact that no flows are ever removed. It also requires that the security processor fetch the security association data before identifying an invalid flow (this may use more memory bandwidth).

The security processor tracks the maximum flow search length (hit and miss) as well as the total number of flows in the flow table. The host may use that information to reset the flow table clearing memory locations directly or using the hardware BIST functionality in the security processor.

Figure 8:
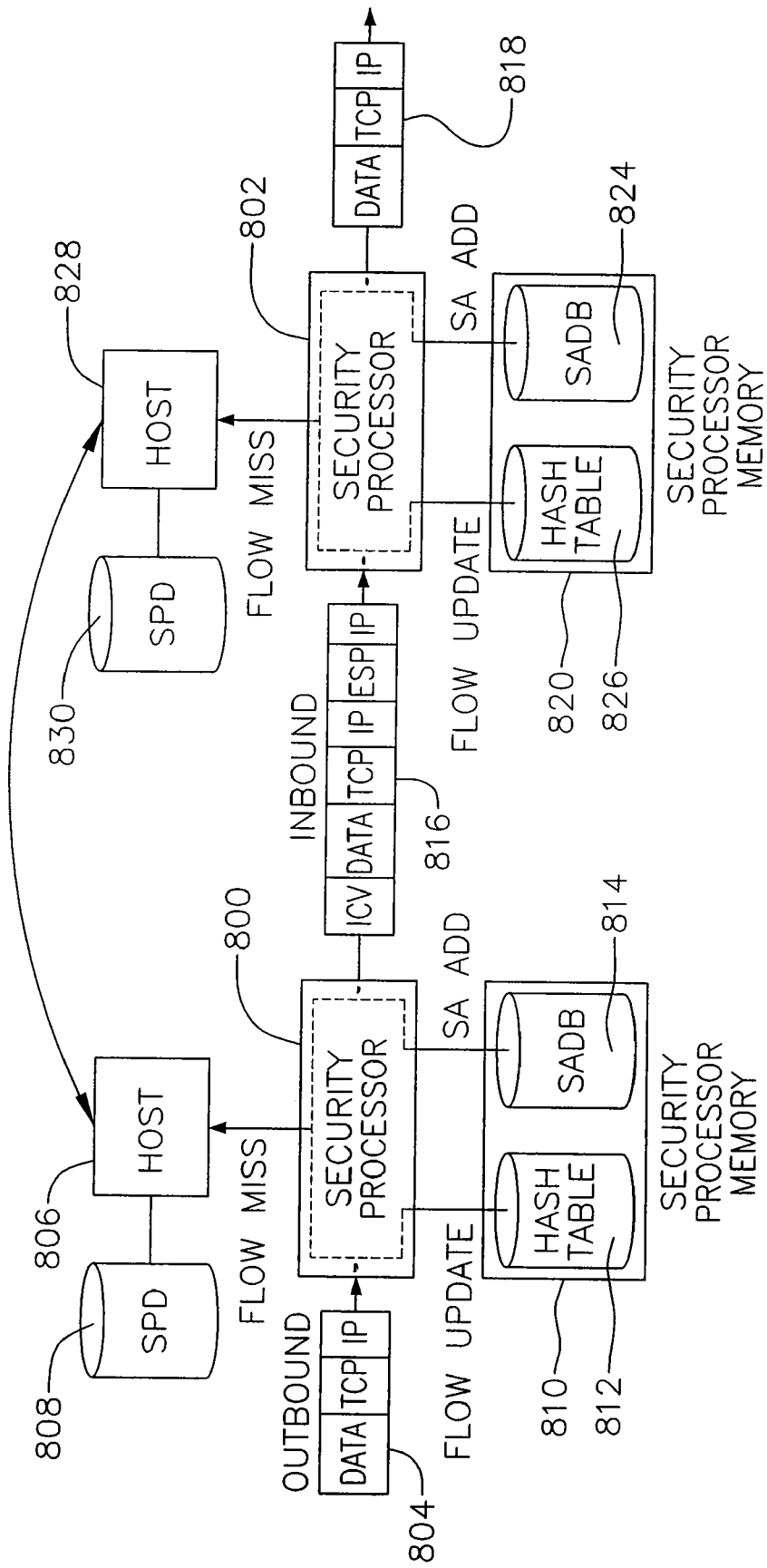
FIG. 8 is a data flow diagram representative of one embodiment of policy management data flow operations that may be performed in accordance with the invention.

FIG. 8 is a data flow diagram representative of one embodiment of system packet flow associated with policy management data flow operations that may be performed in accordance with the invention. The security processor enforces policy on a per packet basis based on a flow table. The diagram in FIG. 8 shows one embodiment of an IPsec system containing two IPsec gateways. The diagram illustrates the packet flow for both outbound and inbound IPsec packets.

The security policy database (SPD) is stored in host memory. The host (remote or local to the security processor) manages the SPD and the IKE processing. The host converts policy into flows that are then managed by the security processor. The flow tables (or Hash Tables) are managed automatically by the security processor.

Starting from the left in FIG. 8, a packet enters the security processor as an outbound packet. The 5-tuple from the packet header is hashed into a key that is used to search the outbound flow table. If a miss occurs, the packet is flagged as an exception packet and sent to the host. The host searches the security policy database (shown in FIG. 10) to determine what action should be taken for this packet.

If security is applied and no security association exists, the host initiates IKE using UDP traffic on port 500 (or 4500) to generate the security association. The security association is added to the security processor using a memory access packet. The 5-tuple (or flow) is then linked with a security association by the host. A flow update packet is sent to the security processor to add the flow to the hash table which includes a link to the proper security association. If a security association already exists for the policy, then the host simply sends the flow update.

Figure 10:
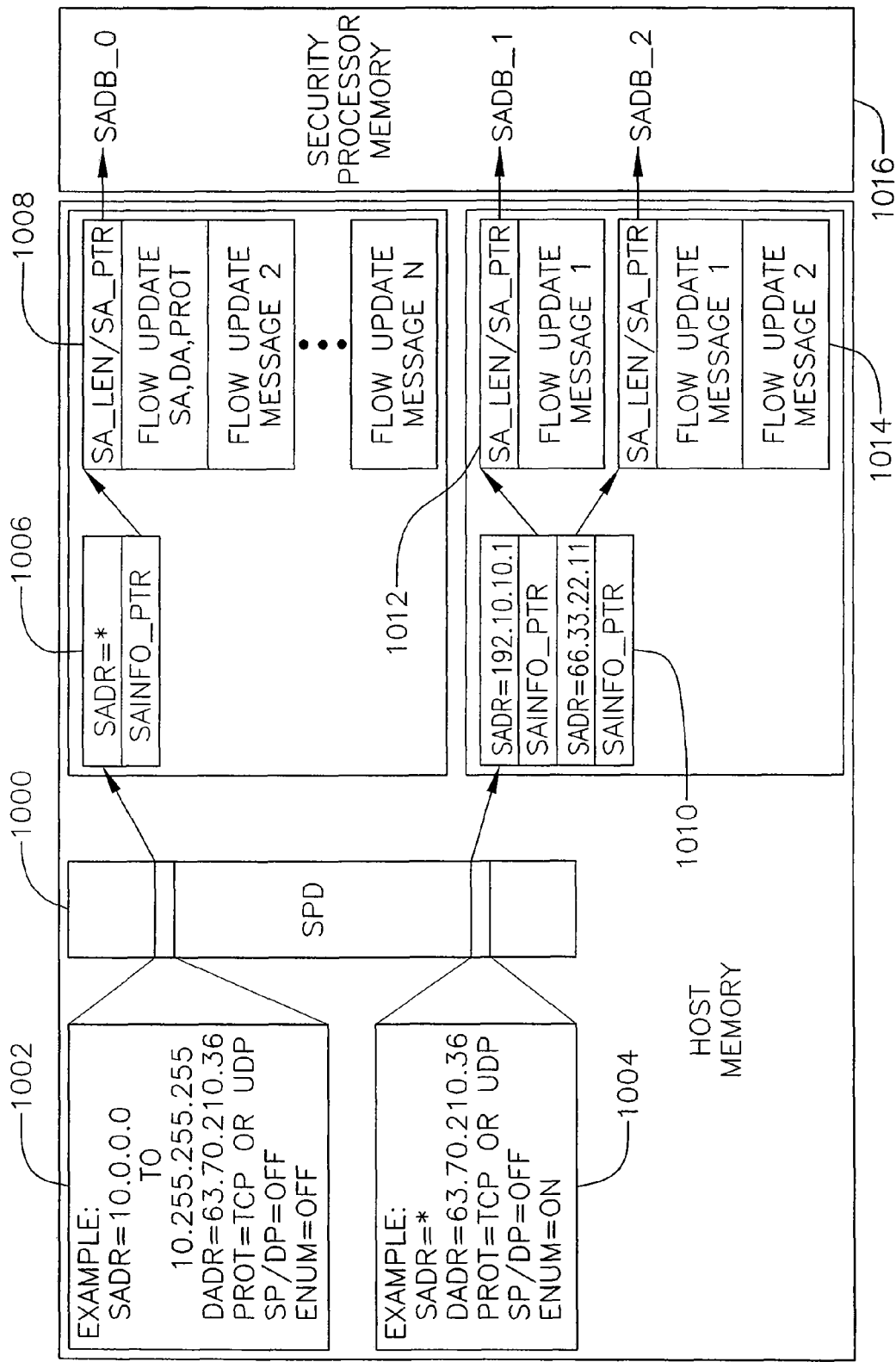
FIG. 10 is a diagram representative of one embodiment of a host policy database that may be used in accordance with the invention.

An example SPD layout of host memory is shown in FIG. 10. The SPD 1000 contains an ordered list of policies that describe the application of security for an individual or group of flows. The host uses the policy database to negotiate security associations with the client (or gateway). The policy database can be abstracted into a number of flows which are then sent to the security processor in Flow Update Access Packets (FAPs).

Since the policy may include wildcards or ranges, there could be many flows pointing to the same SA Data Structure.

The host may keep track of the returning flow update messages from the security processor for particular security associations (as shown in FIG. 10). This method allows the host to remove flows from the security processor when a security association is deleted by simply re-sending the flow update message (the security processor clears the FlowAdd bit thereby creating the flow delete message automatically). Using this method, the flow table is completely controlled by the host, but automatically updated by the security processor (i.e. the host never has to calculate the hash value).

Alternatively, the host may choose to simply age flows in the security processor flow table. The host would set up a number of buckets to collect the returning flow update messages from the security processor. Selecting a time interval "t", provided the maximum flow lifetime of 4t is required, the host sets up 4 buckets. For a duration of "t" time, the host collects all returning flow update messages from the security processor in B0. After "t" time, the host re-sends all messages in B3 to the security processor which delete the previously added flows after no greater than 4t time. Then B3=B2, B2=B1, B1=B0 with B0 used to collect the next bucket of flow update messages.

For inbound packets, the flow update is added when the security association is generated through the IKE process. The flow update is sent to the security processor once the security association is added. The management of the flow table is much simpler since a single SPI will typically point to a single security association (unless multi-homed SA).

Figure 9:
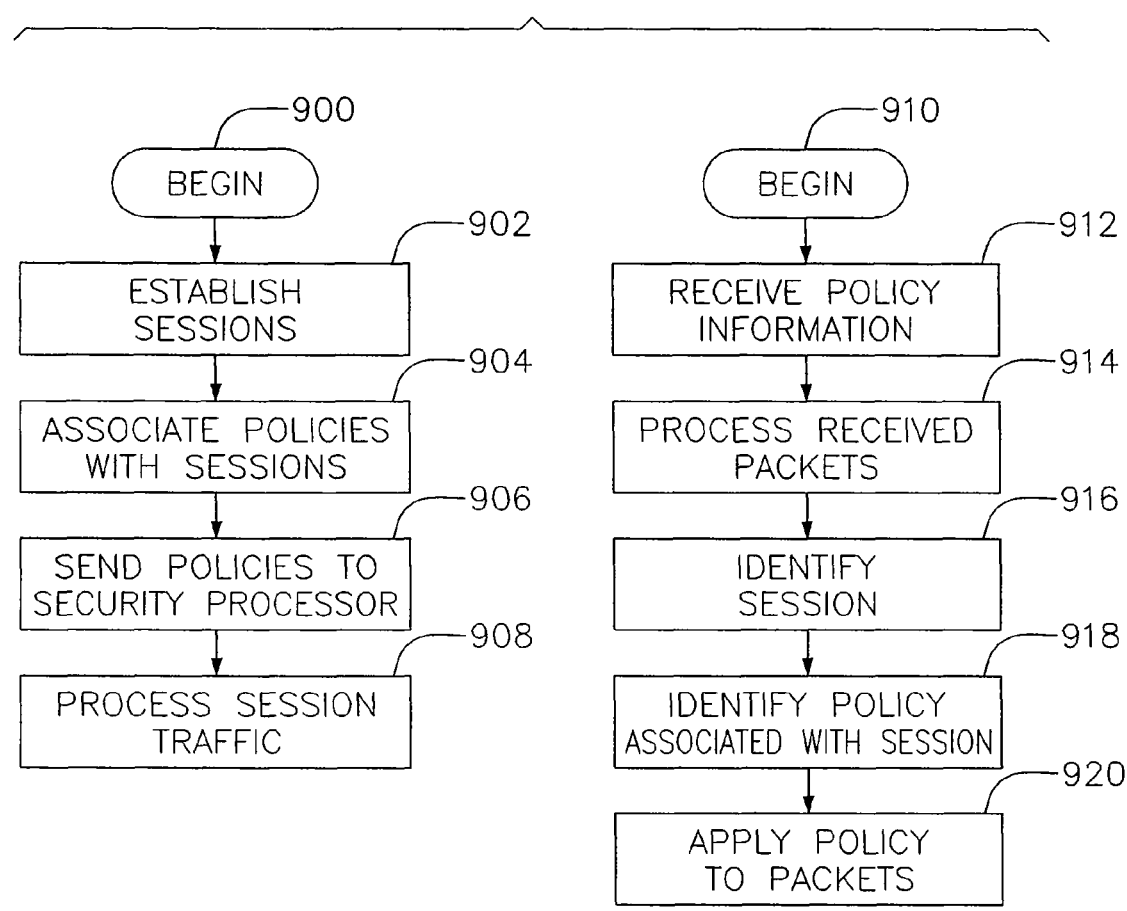
FIG. 9 is a flowchart representative of one embodiment of policy management operations that may be performed in accordance with the invention.

The flowchart of FIG. 9 represents several operations that may be performed in one embodiment of firewall packet pre-classification according to the invention. In FIG. 9, the blocks beginning at block 900 represent operations that may be performed by a host processor. The blocks beginning at block 910 represents operations that may be performed by a security processor.

As represented by block 902, applications executing on a host processor establish sessions with other applications via a packet network. For secure sessions, this may include generating security association information for each session.

As represented by block 904, the host processor may associate firewall classifications with some of the sessions, for use by the security processor. The host processor sends the firewall classifications to the security processor (block 906).

As represented by block 908, when the applications communicate via the sessions, the host processor generates packets for each session and sends the packets to the packet network via the security processor.

Turning now to the operations of the security processor beginning at block 910, as represented by block 912, after the security processor receives the policy information, the security processor processes received packets 1100 (block 914), and may identify the session associated with the packet (block 916). As represented by block 918, the security processor 112 may then identify the policy associated with that session, so that it may apply the policy to the packet (block 920).

Figure 11:
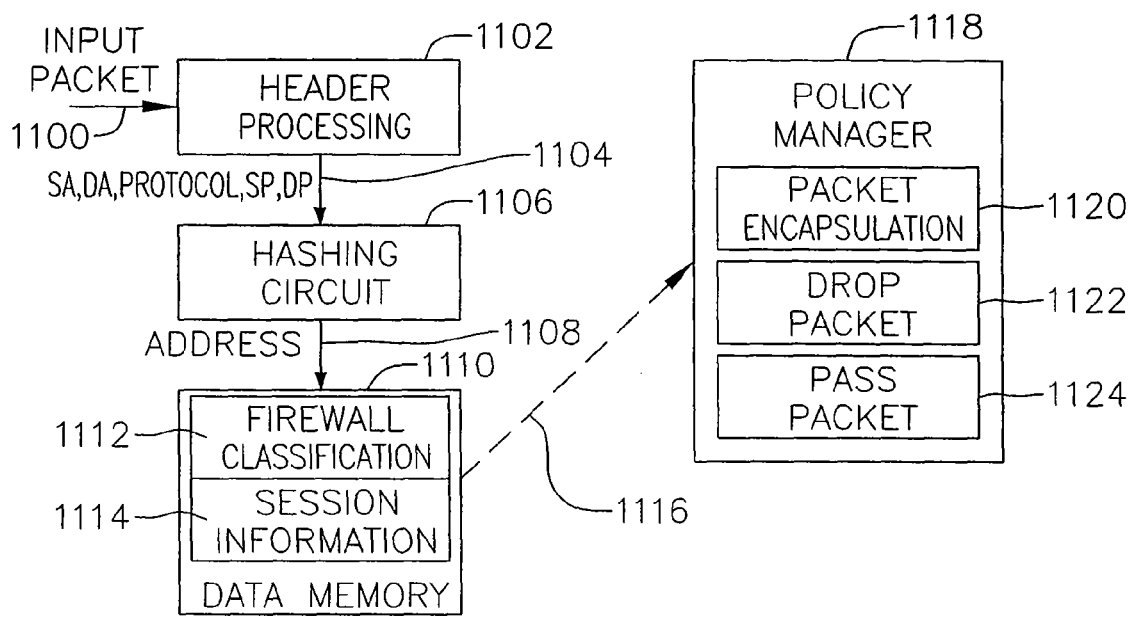
FIG. 11 is a block diagram of one embodiment of a policy management system constructed in accordance with the invention.
Figure 12:
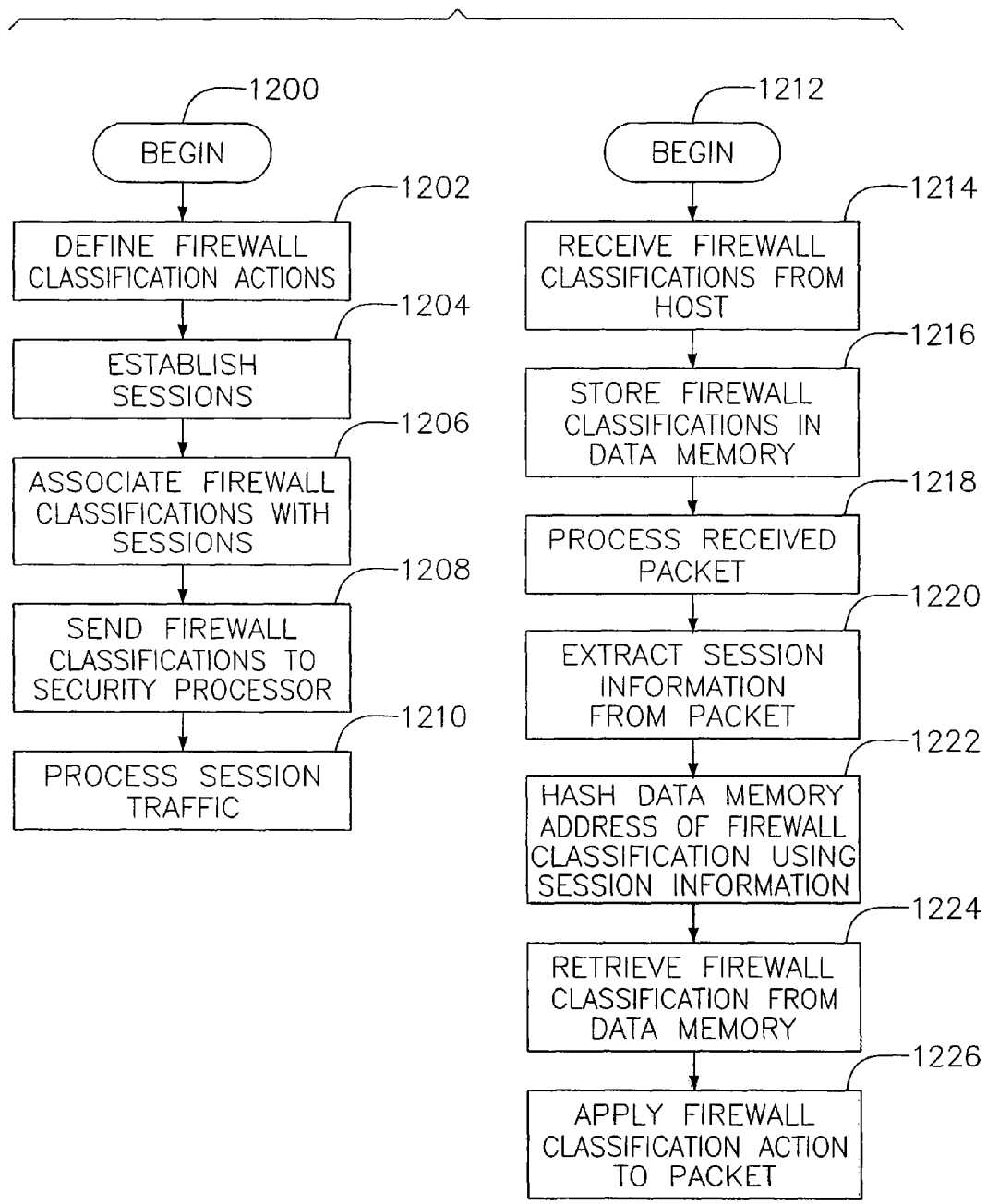
FIG. 12 is a flowchart representative of one embodiment of policy management operations that may be performed in accordance with the invention.

FIG. 11 depicts selected components of one embodiment of a security processor that provides firewall packet pre-classification. Several of the operations of the components of FIG. 11 will be discussed in conjunction with the flowchart in FIG. 12. In FIG. 12, the blocks beginning at block 1200 represent one embodiment of operations that may be performed by a host processor. The blocks beginning at block 1212 represents one embodiment of operations that may be performed by the security processor.

As represented by block 1202, the host processor may define firewall classifications that may be used in conjunction with some of the sessions established by applications executing on the security processor.

As represented by block 1204, applications executing on a host processor establish sessions with other applications via a packet network. For secure sessions, this may include generating security association information for each session.

As represented by block 1206, the host processor may associate the firewall classifications with some of the sessions, for use by the security processor. The host processor sends the firewall classifications to the security processor 112, for example, in a configuration packet over the packet link (block 1208).

As represented by block 1210, when the applications communicate via the sessions, the host processor generates packets for each session and sends the packets to the packet network via the security processor.

Turning now to the operations of the security processor beginning at block 1212, as represented by block 1214, when the security processor receives the configuration packet, the security processing extracts the firewall classifications from the configuration packet. Then, as represented by block 1215, the security processor stores the firewall classifications in a data memory 1110.

When the security processor receives a session packet 1100 (block 1218), header processing 1102 in the security processor may extract session information from the packet (block 1220). The header processing 1104 sends the session information to a hashing circuit 1106. This session information may include, for example, destination address, source address, protocol, destination port and/or source port.

The hashing circuit 1106 then hashes the session information 1104 to generate and address 1108 (block 1222). For example, the hashing circuit may hash the selectors as discussed above. In addition, the hashing function may need to compare the session information 1104 with session information 1114 stored in the data memory 1110 to verify that the correct firewall classification has been located.

Then, as represented by block 1224, based on the address 1108 generated by the hashing circuit 1106, the security processor 112 may retrieve the firewall classification 1112 associated with that session from the data memory 1110.

Next, as represented by line 1116, the policy manager 1118 in the security processor applies the policy defined by the firewall classification to the packet (block 1226). For example, the policy manager 1118 may provide packet encapsulation 1120 to route the packet over the network. The policy manager 1118 may perform a drop packet function 1122 in the event these types of packet are not to be processed or routed on through the network. Alternatively, the policy manager 1118 may perform a pass packet function 1124 to route the packet to, for example, the host processor.

It should be appreciated that the inventions described herein are applicable to and may utilize many different protocols and standards and modifications and extensions of those protocols and standards including, for example and without limitation, IP, TCP, UDP, ICMP, IPsec, SSL and FCsec. Moreover, a variety of cryptographic and signature algorithms and modifications and extensions thereof may be used. The invention may be practiced using tunnel mode and/or transport mode packet processing.

It should also be appreciated that the inventions described herein may be constructed using a variety of physical components and configurations. For example, a variety of hardware and software processing components may be used to implement the functions of the host processors, security processors, network processors and the Ethernet processors/controllers and the other components and processes described herein. These hardware and software components include, without limitation, processors and associated data memory, state machines and logic and may involve execution of software, firmware or other code. Such components may be combined on one or more integrated circuits. For example, several of these components may be combined within a single integrated circuit. Some components may be implemented as a single integrated circuit. Some components may be implemented using several integrated circuits.

In addition, the components and functions described herein may be connected in many different ways. Some of the connections represented by the lead lines in the drawings may be in an integrated circuit, on a circuit board, over a backplane to other circuit boards, over a local network and/or over a wide area network (e.g., the Internet). Thus, some of the components may be located in a remote location with respect to the other components. Typically, one or more of the connections represented by the lead lines in the drawings may, for example, comprise a data network. In addition, these connections may be made with physical wire, fiber and/or wireless connections, for example.

A wide variety of devices may be used to implement the data memories (e.g., local memory, databases and non-volatile memories) discussed herein. For example, a data memory may comprise one or more RAM, disk drive, SDRAM, FLASH or other types of data storage devices.

The invention may be practiced using different types of cipher engines. For example, in one embodiment of the invention data is decrypted using a block cipher, rather than a stream cipher.

In summary, the invention described herein teaches improved data processing techniques. While certain exemplary embodiments have been described in detail and shown in the accompanying drawings, it is to be understood that such embodiments are merely illustrative of and not restrictive of the broad invention. In particular, is should be recognized that the teachings of the invention apply to a wide variety of systems and processes that are configurable. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method comprising:
   receiving a packet;
   extracting information from the packet;
   receiving a first set of bits in a register having a configurable width, wherein the first set of bits comprises a first portion of the information extracted from the packet;
   associating each of a plurality of initial random numbers with a respective bit in the first set of bits;
   selecting a subset of the plurality of initial random numbers based on a value of the respective bit associated with each initial random number; and
   generating a first hash value based on the selected subset of initial random numbers.

2. The method of claim 1, further comprising generating each of the initial random numbers using a plurality of pseudo random number generators.

3. The method of claim 2, wherein a number of pseudo random number generators in the plurality of pseudo random number generators is equal to the width of the register.

4. The method of claim 1, further comprising configuring a size of the initial random number, wherein the size of the initial random number is a width of the first hash value.

5. The method of claim 1, further comprising storing the first hash value in a second register.

6. The method of claim 5, further comprising:
   receiving a second set of bits in the register, wherein the second set of bits comprises a second portion of the information extracted from the packet;
   associating each of a plurality of second initial random numbers with a respective bit in the second set of bits;
   selecting a subset of the plurality of second initial random numbers based on a value of the respective bit associated with each second initial random number; and
   generating a second hash value based on the selected subset of second initial random numbers.

7. The method of claim 5, further comprising separating the information into a plurality of sets of bits.

8. The method of claim 7, further comprising:
after processing the first set of bits, receiving each subsequent set of bits in the plurality of sets of bits in the register;
associating each of a plurality of subsequent initial random numbers with a respective bit in the subsequent set of bits;
selecting a subset of the plurality of subsequent initial random numbers based on a value of the respective bit associated with each subsequent initial random number; and
generating a subsequent hash value based on the selected subset of subsequent initial random numbers, wherein a final hash value is generated based on the first hash value and each subsequent hash value.

9. The method of claim 8, wherein each portion of the bits is processed each clock cycle.

10. The method of claim 1, wherein the packet comprises a plurality of selectors, and wherein the selectors are extracted from the packet.

11. A hashing circuit for sequentially processing a plurality of segments of input data to generate a hash of the input data, comprising:
a first register having a configurable width, wherein the first register is configured to receive a segment in the plurality of segments of input data;
a plurality of first circuits, each first circuit configured to receive a bit from the segment of the input data, including a pseudo random number generator coupled to a selector;
a second circuit configured to combine the output of each selector; and
a second register configured to:
receive the combined output of the second circuit,
generate an input to the second circuit if an additional segment of input data in the plurality of segments of input data remains to be processed, and
generate a final hash if no segment of input data in the plurality of segments of input data remains to be processed.

12. The circuit of claim 11, wherein a number of first circuits corresponds to the width of the first register.

13. The circuit of claim 11, wherein each pseudo random number generator comprises a linear feedback shift register.

14. The circuit of claim 11, wherein a first XOR circuit in the second circuit is coupled to the output of the second register.

15. The circuit of claim 14, wherein a final XOR circuit in the second circuit is coupled to an input of the second register.

16. The circuit of claim 11, wherein the second circuit further comprises:
a first XOR circuit coupled to an output of the second register;
N−2 subsequent XOR circuits coupled to a selector in the respective first circuit, wherein N is equal to the number of the first circuits; and
a final XOR circuit coupled to an input of the second register.

17. The circuit of claim 16, wherein the second register is configured to receive a combined XORed output of each XOR circuit in the second circuit.

18. A method comprising:
determining a desired width of a final hash value;
determining a desired width of a register;
receiving a packet;
extracting information from the packet;
receiving a first set of bits in the register, wherein the first set of bits comprises a first portion of the information extracted from the packet;
associating each of a plurality of initial random numbers with a respective bit in the first set of bits;
selecting a subset of the plurality of initial random numbers based on a value of the respective bit associated with each initial random number;
generating a first hash value based on the selected subset of initial random numbers;
receiving each subsequent set of bits in the register;
associating each of a plurality of subsequent initial random numbers with a respective bit in the subsequent set of bits;
selecting a subset of the plurality of subsequent initial random numbers based on a value of the respective bit associated with each subsequent initial random number; and
generating a subsequent hash value based on the selected subset of subsequent initial random numbers, wherein the final hash value is generated based on the first hash value and each subsequent hash value.

19. The method of claim 18, wherein each portion of the bits is processed each clock cycle.

* * * * *